(12) United States Patent
Hirahara et al.

(10) Patent No.: US 8,358,427 B2
(45) Date of Patent: Jan. 22, 2013

(54) CONFIDENTIAL DOCUMENTS MANAGEMENT SYSTEM

(75) Inventors: Yoshiyuki Hirahara, Mishima (JP); Kazunobu Takahashi, Sunto-gun (JP); Yasunari Miyazaki, Sunto-gun (JP); Norikazu Ochiai, Sunto-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 940 days.

(21) Appl. No.: 11/675,418

(22) Filed: Feb. 15, 2007

(65) Prior Publication Data

US 2008/0198421 A1 Aug. 21, 2008

(51) Int. Cl.
*G06K 15/00* (2006.01)
*G06F 3/12* (2006.01)

(52) U.S. Cl. ...... 358/1.14; 358/1.15; 358/1.1; 358/1.16; 358/1.17; 358/1.18

(58) Field of Classification Search ........ 358/1.11–1.18, 358/1.1; 382/306; 241/36; 715/500; 726/21; 396/15
See application file for complete search history.

(56) References Cited

U.S. PATENT DOCUMENTS

| 7,746,488 | B2* | 6/2010 | Ahn ............................. 358/1.14 |
| 2002/0154335 | A1* | 10/2002 | Matoba et al. ................ 358/1.15 |
| 2003/0171988 | A1* | 9/2003 | Sugihara ......................... 705/14 |
| 2005/0128506 | A1 | 6/2005 | Sato |
| 2005/0168769 | A1* | 8/2005 | Kim et al. .................... 358/1.14 |
| 2006/0222352 | A1* | 10/2006 | Kawase et al. ................ 396/15 |
| 2006/0274352 | A1* | 12/2006 | Nakaguma et al. .......... 358/1.14 |
| 2006/0285147 | A1* | 12/2006 | Wolfman et al. ............. 358/1.14 |
| 2007/0050696 | A1* | 3/2007 | Piersol et al. ................. 715/500 |
| 2007/0080249 | A1* | 4/2007 | Hamasuna et al. ............. 241/36 |
| 2007/0177824 | A1* | 8/2007 | Cattrone et al. .............. 382/306 |
| 2007/0206205 | A1* | 9/2007 | Suzuki ........................... 358/1.1 |
| 2007/0290499 | A1* | 12/2007 | Tame .............................. 283/70 |
| 2008/0163364 | A1* | 7/2008 | Ferlitsch .......................... 726/21 |
| 2009/0161141 | A1* | 6/2009 | Shobu .......................... 358/1.14 |
| 2009/0201535 | A1* | 8/2009 | Nagao et al. ................. 358/1.15 |
| 2009/0201536 | A1* | 8/2009 | Yoda et al. ................... 358/1.15 |

FOREIGN PATENT DOCUMENTS

| JP | 2000-185449 | 7/2000 |
| JP | 2003-152979 | 5/2003 |
| JP | 2004-230603 | 8/2004 |
| JP | 2004-280227 | 10/2004 |
| JP | 2005-190426 | 7/2005 |
| JP | 2005-199698 | 7/2005 |
| JP | 2006-093921 | 4/2006 |
| JP | 2006-099348 | 4/2006 |
| JP | 2007-088795 | 4/2007 |

OTHER PUBLICATIONS

Japanese Office Action for Japanese Application No. 2007-278104 mailed on Nov. 8, 2011.

* cited by examiner

*Primary Examiner* — Satwant Singh
(74) *Attorney, Agent, or Firm* — Turocy & Watson, LLP

(57) ABSTRACT

An image forming apparatus management system of an embodiment of the invention includes a first storage unit to store a document, an input unit to input print document data as use setting of the document after printing, a second storage unit to store the print document data inputted by the input unit, a print unit to print the document, and a control unit to manage the print document based on the print document data stored in the second storage unit.

20 Claims, 6 Drawing Sheets

```
Printer
Name: Toshiba Laser 5                    Printed matter registration
State: Idle
Kind: Toshiba Laser 5                    Registration from address book
Place: ¥¥TEC-MSJT9¥2F_ToshibaL5
Comment:

Print range                   Print range
  ○ All          ☐ From page    Number      ☐
  ○ Page designation ☐ To page  of prints   1

Print object

Print preview
```

FIG. 8

```
| Basic | Image adjustment | Application | Security |

↓ Security is selected

| Address book | Registrant name
                  Name: ○○○○
                  Name: ○○○○
                  Name: ○○○○
```

FIG. 9

CONFIDENTIAL DOCUMENTS MANAGEMENT SYSTEM

BACKGROUND OF THE INVENTION

1. Field of the Invention

The present invention relates to a confidential documents management system to manage confidential documents printed by using an image forming apparatus connected through a network.

2. Description of the Related Art

As is well known, in recent years, there is an image forming apparatus having a plurality of functions such as a copy function, a facsimile function, a scanner function, a printer function or an image filing function. Besides, the image forming apparatus as stated above is connected to an arbitrary number of personal computers (hereinafter referred to as PCs) and the outside through, for example, a network. Further, the image forming apparatus as stated above executes a print processing in accordance with a print request from the PC connected through the network.

The user performs the print processing of documents having high confidentiality by the image forming apparatus as the need arises. In the print processing of the documents having high confidentiality, the processing is performed using a shredder or overlap printing function, so that another person can not confirm the information. However, information such as the history of printing or copying of the confidential documents is not managed, they are easily copied by another person, and the information is leaked. With respect to the information leak, information (printing date, the number of prints, the remaining printable number of sheets, confidential management number, etc.) of a printing person having printed the confidential documents is printed as a mark or a pattern on the confidential documents, so that the copy of the confidential documents is restricted. Further, the information of the printing person is managed by the image forming apparatus or an external storage apparatus. However, since the deletion of the past data history is inconsistent with the disposal of the confidential documents, there has been a problem that management can not be performed as to whether the confidential documents have been disposed of or remain printed.

Accordingly, the invention provides a confidential documents management system to manage confidential documents and history data of printing or copying of the confidential documents.

BRIEF SUMMARY OF THE INVENTION

A confidential documents management system of the invention includes a first storage unit to store a document, an input unit to input print document data as use setting of the document after printing, a second storage unit to store the print document data inputted by the input unit, a print unit to print the document, and a control unit to manage the printed document based on the print document data stored in the second storage unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a view displayed on a display unit of the PC in the embodiment of the invention.

FIG. 9 is a view displayed on a display unit of the image forming apparatus in the embodiment of the invention.

DETAILED DESCRIPTION OF THE INVENTION

Figure 1:
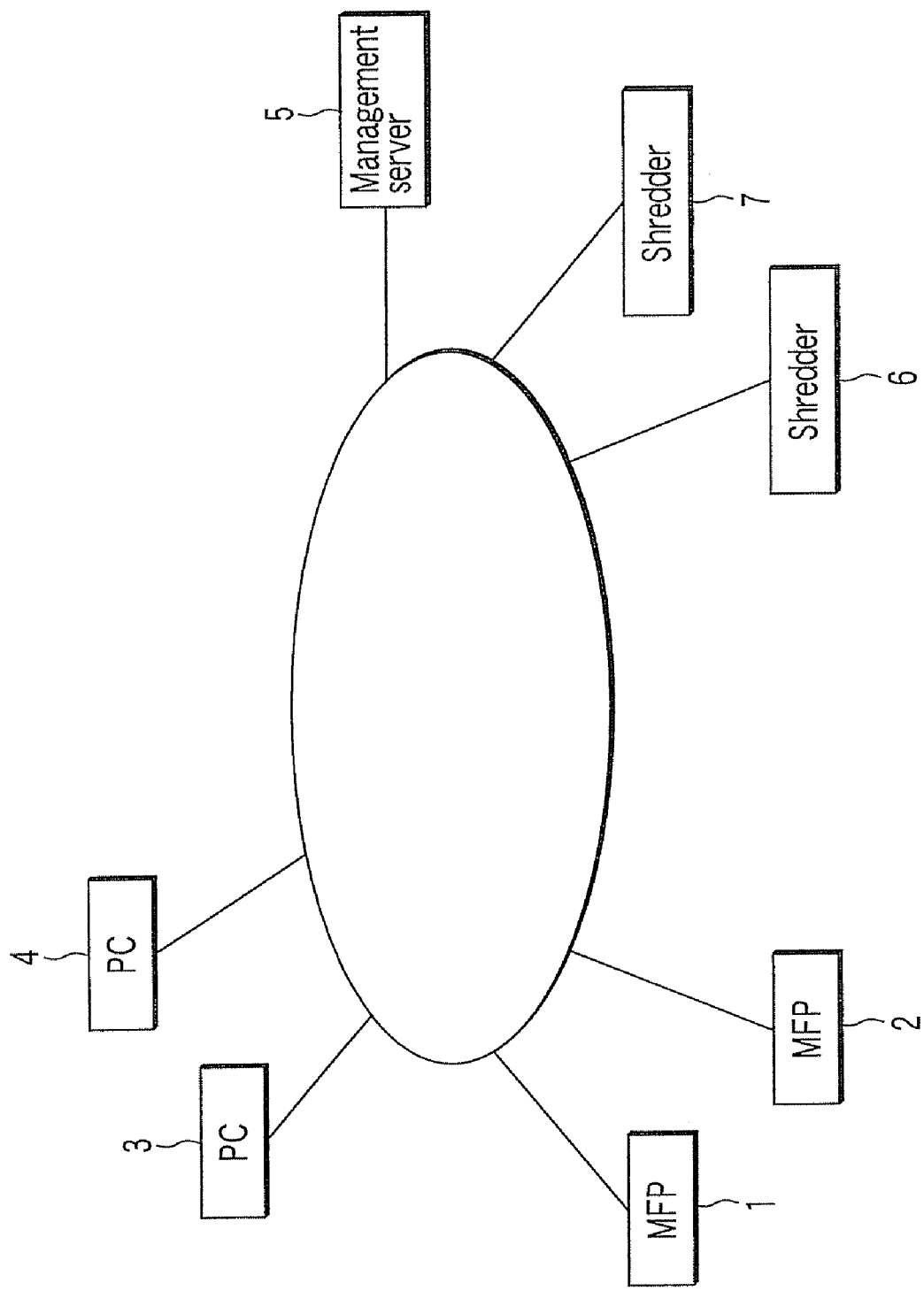
FIG. 1 is a view schematically showing a network structure in an embodiment of the invention.

Embodiments of the invention will be described with reference to the drawings. FIG. 1 is a view schematically showing a network structure in which a plurality of image forming apparatuses (hereinafter referred to as MFP (Multi Function Peripheral)), a plurality of PCs, an external storage apparatus (management server) and a plurality of document disposal apparatuses (shredders) are connected to one another. As shown in FIG. 1, an MFP 1, an MFP 2, a PC 3, a PC 4, a management server 5, a shredder 6 and a shredder 7 are connected to one another through a network. Although the network may be the Internet, it is made a local area network. Besides, in this embodiment, a description will be given to a case where two MFPs of the MFP 1 and the MFP 2, two PCs of the PC 3 and the PC 4, and two shredders of the shredder 6 and the shredder 7 are connected to one another through the network. However, the number of MFPs, PCs and shredders is not limited to this.

The MFP 1 or the MFP 2 is a multi-function printer having a facsimile function, a printer function, a copy function, a scanner function, a network function and the like. The MFP 1 or the MFP 2 is an apparatus to print or copy confidential documents. Further, the MFP 1 or the MFP 2 is an apparatus to print, when the confidential documents are printed, characters on the confidential documents. Although there are also other functions, the details will be described later in an operation example.

The PC 3 or the PC 4 is an apparatus to input, when the confidential documents are printed, confidential document data indicating who is a printing person, when is the date of printing, what confidential documents (title or only rough information) are printed, where (place of a storing shelf or the like) the printed confidential documents are stored, whether the documents are temporarily printed, how many prints are made for each, until when each is stored or by when it is disposed of, and whether copy is inhibited or not. Although there are other functions, the details will be described later in an operation example.

The management server 5 is an apparatus to manage (update, delete, store, etc.) the confidential document data. Further, it is an apparatus to convert the confidential document data into a character (for example, a one-dimensional bar code (JAN code, etc.), a two-dimensional code (CODE49, QR code, etc.), a mark (secret character, watermark character, etc.), list of the confidential document data, or the like) printable on the confidential documents. Further, there is provided a function of sending a message to a specified person, such as a printing person or a confidential document manager, when a fixed period has passed since printing or copying was performed or when a time limit has expired (for example, before or after the storage time limit of the documents). Although there are other functions, the details will be described later in an operation example.

The shredder 6 or the shredder 7 is an apparatus to shred the confidential documents so that another person can not recognize them.

Figure 2:
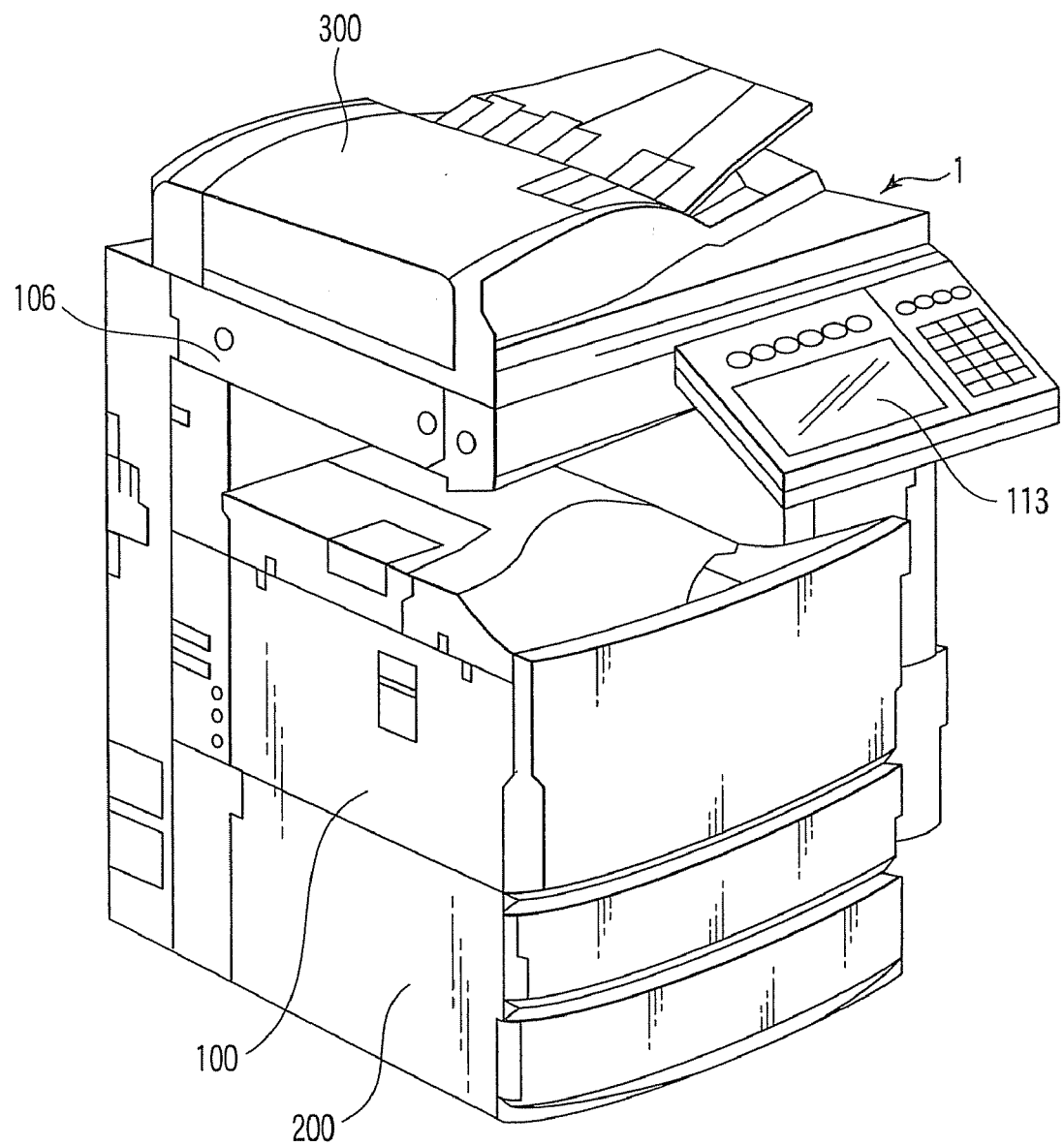
FIG. 2 is a view showing the outer appearance of an image forming apparatus in the embodiment of the invention.

FIG. 2 shows the principal part of the MFP 1 to which the invention can be applied. Since the MFP 1 and the MFP 2 have the same structure, the structure of the MFP 1 will be described. The MFP 1 shown in FIG. 2 includes an image forming part main body 100 for outputting image information as an output image called, for example, a hard copy or printout, a sheet supply unit 200 capable of supplying a sheet (output medium) of an arbitrary size used for the image output to the image forming unit main body 100, and a scanner unit 106 to capture, as image data, the image information as an object of image formation in the image formation unit main body 100 from a physical object (hereinafter referred to as an original document) holding the image information. Incidentally, the scanner unit 106 is integrally provided with an automatic document feeder 300 to discharge, in a case where the original document is sheet-like, after the end of formation of the image output or capture (hereinafter referred to as reading) of the image information, the original document after the end of the reading to a discharge position from a reading position, and to guide a next original document to the reading position. Besides, an instruction input unit to instruct the start of image formation in the image formation unit main body 100 and the start of reading of the image information of an original document by the scanner unit 106, that is, a control panel (operation unit) 113 is provided at a specified position of the MFP 1, for example, the end part of the front of the scanner 106.

Figure 3:
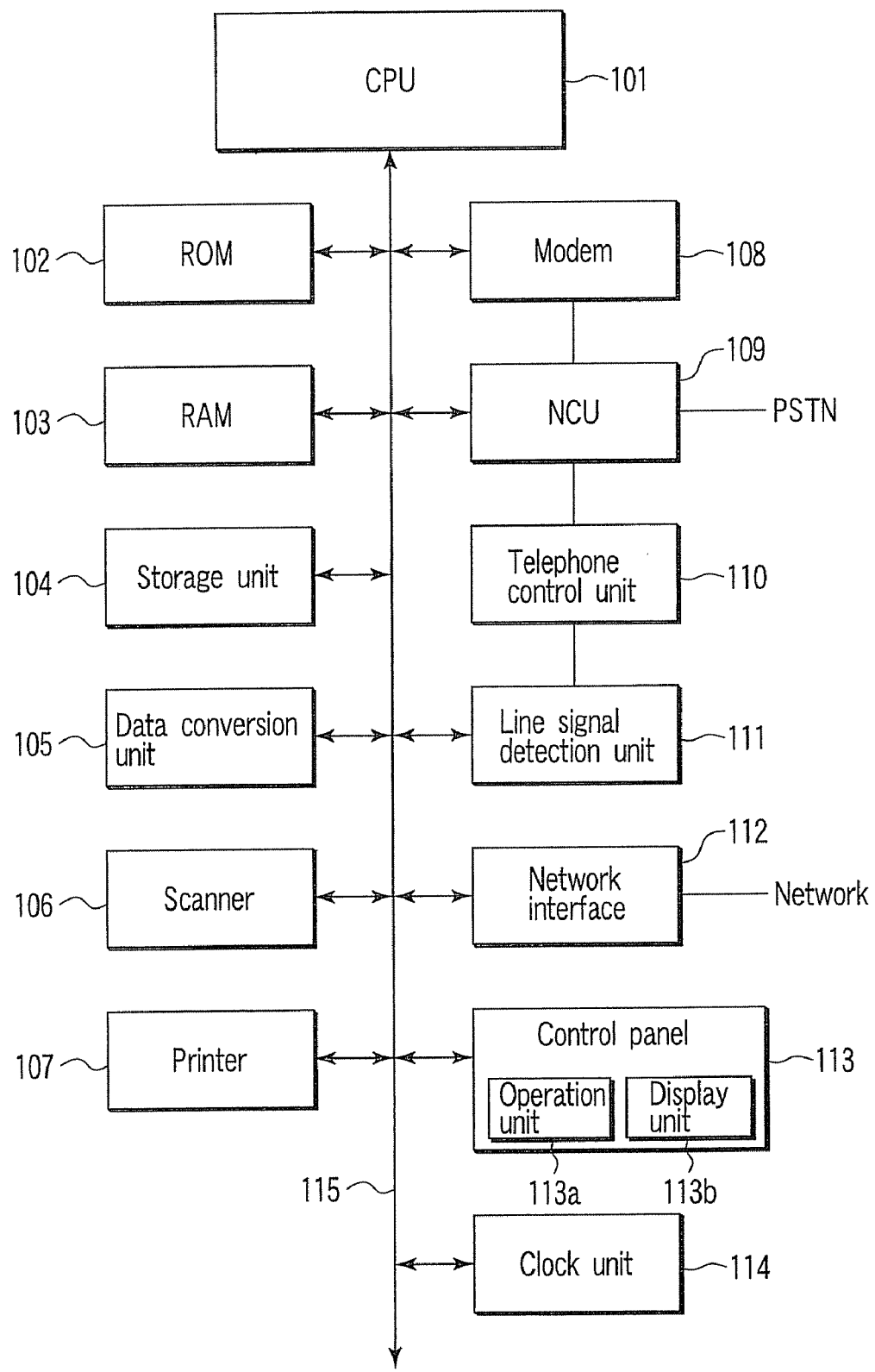
FIG. 3 is a block diagram showing the principal structure of the image forming apparatus in the embodiment of the invention.

FIG. 3 is a block diagram showing the principal structure of the MFP 1. The MFP 1 includes a CPU 101, a ROM 102, a RAM 103, a storage unit 104, a data conversion unit 105, a scanner 106, a printer 107, a modem 108, an NCU 109, a telephone control unit 110, a line signal detection unit 111, a network interface 112, a control panel 113 and a clock unit 114.

The CPU 101, the ROM 102, the RAM 103, the storage unit 104, the data conversion unit 105, the scanner 106, the printer 107, the modem 108, the NCU 109, the line signal detection unit 111, the network interface 112, the control panel 113 and the clock unit 114 are connected to one another through a bus line 115. The NCU 109 is connected with the modem 108 and the telephone control unit 110. Further, the telephone control unit 110 is connected with the line signal detection unit 111.

The CPU 101 executes control processing to collectively control the respective parts based on a control program stored in the ROM 102, and realizes the operation as the MFP 1. The ROM 102 stores the control program of the CPU 101, and the like. The RAM 103 is used as a work area for storing various information required for the CPU 101 to perform various processings. The storage unit 104 is, for example, a hard disk drive (HDD). The storage unit 104 temporarily stores image data, and records data relating to various settings. The data conversion unit 105 performs an encoding processing for redundancy compression on the image data, and decodes the image data encoded for the redundancy compression. The scanner 106 reads a transmission original document and generates the image data indicating the transmission original document. The printer 107 prints an image indicated by the image data on a recording sheet.

The modem 108 is for generating a facsimile transmission signal by modulating the image data or for generating a command transmission signal by modulating a command given from the CPU 101. The modem 108 sends these transmission signals through the NCU 109 to a public telephone line (PSTN subscriber line). The modem 108 demodulates the facsimile transmission signal coming through the PSTN subscriber line and given through the NCU 109 and reproduces the image data, or demodulates the command transmission signal to reproduce the command. The NCU 109 is connected with the PSTN subscriber line contained in the PSTN. The NCU 109 performs state monitoring or transmission processing to the network with respect to the connected PSTN subscriber line. Besides, the NCU 109 performs level setting of the facsimile transmission signal to be sent to the PSTN subscriber line. The telephone control unit 110 is connected with an external telephone as the need arises. The line signal detection unit 111 receives, through the NCU 109 and the telephone control unit 110, the signal coming through the PSTN subscriber line, and detects the coming of the specified signal.

The network interface 112 is used for connection to the network. The network interface 112 receives a print job of print data from, for example, a PC 7 connected through the network. Besides, the network interface 112 performs data transmission through the network. The control panel 113 includes an operation unit 113*a* to receive various instruction inputs to the CPU 101 by the user, and a display unit 113*b* to display various information to be notified to the user under the control of the CPU 101. The clock unit 114 always performs a clocking operation, and outputs current time information indicating the current time.

Figure 4:
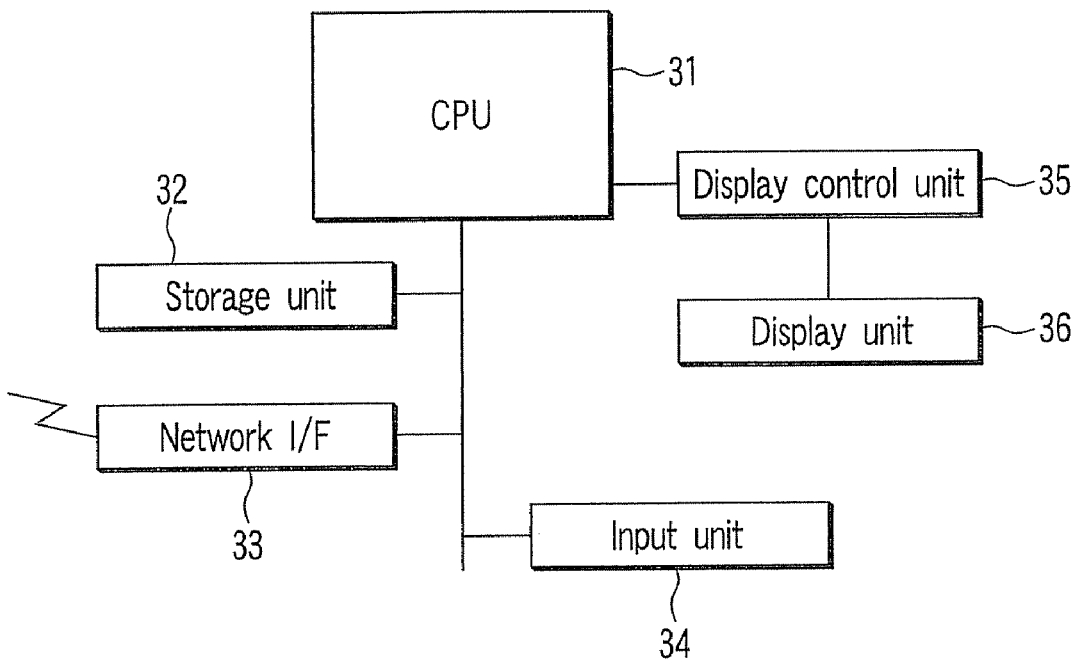
FIG. 4 is a block diagram showing the principal structure of a PC in the embodiment of the invention.

FIG. 4 is a block diagram showing the structure of a control system of a PC to which the invention can be applied. Since the PC 3 and the PC 4 have the same structure, the structure of the PC 3 will be described. As shown in FIG. 4, the PC 3 includes a CPU 31, a storage unit 32, a network interface 33, an input unit 34, a display control unit 35, and a display unit 36. The CPU 31 executes programs recorded in the storage unit 32 such as a ROM, an NVM, or a hard disk drive (HDD). The storage unit 32 stores various data such as various setting data, control programs or control data. The storage unit 32 records also data of secret documents. The network interface 33 communicates data via the network. The input unit 34 inputs various settings and can make a determination on a processing. The display control unit 35 controls a screen to be displayed on the display unit 36. The display control unit 35 reads the program and control data stored in the storage unit 32 based on the input information inputted through the input unit 34 by the user, and displays the screen. The display unit 36 is a display, and displays the screen controlled by the display control unit 35.

Figure 5:
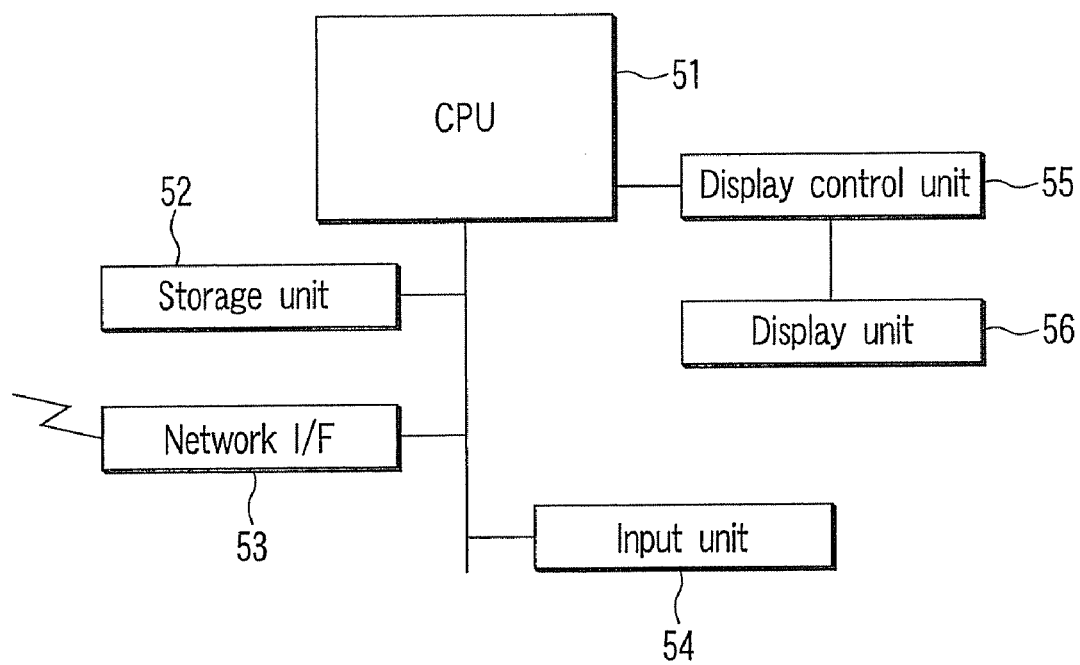
FIG. 5 is a block diagram showing the principal structure of a management server in the embodiment of the invention.

FIG. 5 is a block diagram showing the structure of a control system of the management server to which the invention can be applied. As shown in FIG. 5, the management server 5 includes a CPU 51, a storage unit 52, a network interface 53, an input unit 54, a display control unit 55 and a display unit 56. The CPU 51 executes programs stored in the storage unit 52 such as a ROM, an NVM, or a hard disk drive (HDD). The storage unit 52 stores various data such as various setting data, control programs or control data. The network interface 53 communicates data via the network. The input unit 54 can input various settings and can make a determination on a processing. The display control unit 55 controls a screen to be displayed on the display unit 56. The display control unit 55 reads the program and control data stored in the storage unit 52 based on the input information inputted through the input unit 54 by the user, and displays the screen. The display unit 56 is a display, and is for displaying the screen controlled by the display control unit 55.

Figure 6:
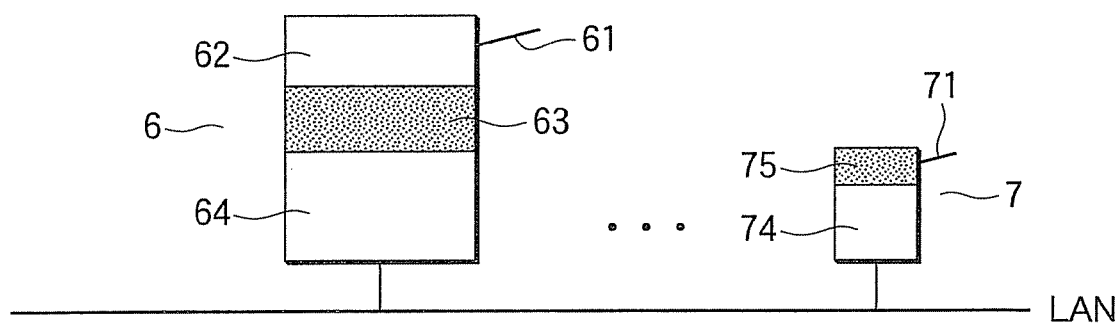
FIG. 6 is a view showing the structure of a shredder in the embodiment of the invention.

FIG. 6 is a schematic view showing the structure of a shredder to which the invention can be applied. The shredder 6 includes a document insertion unit 61, a character read unit 62, a shredding unit 63, and a chip receiving unit 64. The shredder 6 is connected to the MFP 1, the MFP 2, the PC 3, the PC4, and the management server 5 through the LAN. The character read unit 62 has a function to read the characters printed on the confidential documents. The shredding unit 63 shreds the confidential documents. The character read unit 62 is structured to read the characters printed on the confidential documents before the confidential documents are shredded by the shredding unit 63. Besides, the shredder 7 includes a character read shredding unit 75 in which a character read device is provided in a shredding unit and the character is read while shredding is performed, a document insertion unit 71, and a chip receiving unit 74. The shredder 7 is connected to the MFP 1, the MFP 2, the PC 3, the PC 4, and the management server 5 through the LAN. The structure is such that the characters printed on the confidential documents are read before the confidential documents are shredded, and in this embodiment, either may be used.

Next, a first embodiment of the invention will be described. When the printing person instructs printing of confidential documents by using, for example, the PC 3, he or she uses the input unit 34 to input confidential document data indicating, with respect to the confidential documents read from the storage unit 32, who is the user, when is the date of printing, what confidential documents (title or only rough information) are printed, where (place of a storing shelf or the like) the confidential documents to be printed are stored, whether the documents are temporarily printed, how many prints are made for each, until when each is stored or by when it is disposed of, and whether copy is inhibited or not, and sends the confidential document data to the management server 5. The confidential documents may be stored in a not-shown storage apparatus which can be accessed from the PC connected through the LAN, but in which the deletion of the confidential documents can not be performed by unauthorized persons other than the manager.

The management server 5 having received the confidential document data has an application to confirm whether the confidential documents as a print object were printed in the past by comparing them with all confidential document data managed in the storage unit 52. When the CPU 51 of the management server 5 determines that the data of the confidential documents of the confidential documents to be printed is not included in the confidential document data managed by the management server 5, the CPU 51 performs a processing to newly store the confidential document data into the storage unit 52. Further, in the case where the confidential documents as the print object were printed in the past, the management server 5 has an application to notify the PC 3 of the information that the print object is the already printed confidential documents and the information of the confidential document data indicating who is the user, when is the date of printing, and the like. Thus, in the case where the confidential document data of the confidential documents as the print object is managed by the management server 5, the CPU 51 of the management server 5 transmits the information for confirmation of reprinting to the PC 3. The CPU 31 of the PC 3 displays the screen to select whether printing is again performed or is cancelled on the display unit 36 in order to notify the user.

When the CPU 31 of the PC 3 having received the notification of the print confirmation from the management server 5 transmits the reprinting start information inputted through the input unit 34 by the user to the management server 5, the CPU 51 of the management server 5 changes the confidential document data managed in the storage unit 52 and stores it. When the confidential document data is changed and stored, the CPU 51 of the management server 5 stores also the information of the date and time of the printing as the confidential document data.

Further, the management server 5 includes an application to convert the confidential document data stored in the storage unit 52 into a character (for example, a one-dimensional bar code such as a JAN code, a two-dimensional code such as CODE49 or QR code, a secret character or a watermark character, a list of the confidential document data, or the like). In this case, when the PC 3 instructs to produce a plurality of prints of the confidential documents, the CPU 51 of the management server 5 converts the confidential document data into characters capable of identifying the individual prints of the confidential documents.

Here, although the storage unit 52 of the management server 5 stores the confidential document data, since a large memory area is not required for the storage of the confidential document data, instead of the management server 5, the storage unit 104 of the MFP 1 may store the confidential document data. A specific MFP is made to have the functions, so that the system of this embodiment can be simplified. When the confidential documents are printed, the printer 107 of the MFP 1 prints also a character (a one-dimensional bar code such as a JAN code, a two-dimensional code such as CODE49 or QR code, a secret character or a watermark character, a list of the confidential document data, or the like) generated in the management server 5 on the confidential documents. That is, the printer 107 of the MFP 1 prints the confidential documents and the character at the same time.

Next, when the confidential documents on which the character has been printed is copied by the MFP 1, the scanner 106 of the MFP 1 reads the character printed on the confidential documents. When the scanner 106 of the MFP 1 reads the character printed on the confidential documents, the printer 107 of the MFP 1 starts to print when the user makes a specific input by the touch panel of the display unit 113$b$ or the operation unit 113$a$. The specific input includes user information (for example, the name, employee number, group identification information or the like, and the input system includes a contact input system, such as password input by the touch panel of the display unit 113$b$ or the operation unit 113$a$, or a contact IC card, and a non-contact input system, such as fingerprint authentication or face authentication, voice authentication, or a non-contact IC card such as Felica), and information of a use after printing (for example, whether the confidential documents to be copied are printed for storage or temporarily printed, where is the storage place, until when, and how many prints are stored, in the case of the temporal printing, by when they are disposed of). Thereafter, the printer 107 starts to print the confidential documents.

Before the user uses the MFP 1 to execute copying of the confidential documents on which the character has been printed, the user inputs the information to copy the confidential documents by the touch panel of the display unit 113$b$ or the operation unit 113$a$ (for example, the touch panel of the display unit 113*b* or the confidential document copy button of the operation unit 113*a* is pressed to input the information), and inputs the information of the user and the information of the use after the printing, and then, the printer 107 of the MFP 1 may be made to start to print.

The CPU 101 of the MFP 1 transmits the inputted data of the information of the use after the printing to the management server 5. The CPU 51 of the management server 5 updates the confidential document data stored in the storage unit 52 based on the data of the information of the use after the printing transmitted from the MFP 1, and stores it. The CPU 31 of the management server 5 converts the updated confidential document data into new characters, and when the confidential documents are printed, the printer 107 of the MFP 1 prints the new characters on the confidential documents.

Further, the MFP 1 has a function to display confidential document data on the control panel 113. For example, the user depresses the touch panel of the display unit 113*b* of the MFP 1 or the confidential document data button of the operation unit 113*a*. The user inputs a password by the touch panel of the display unit 113*b* or the operation unit 113*a*. Since the MFP 1 determines from the input of the password whether the operation is permitted or inhibited, this operation can be limited so that it is performed only by the specified person. The CPU 101 of the MFP 1 scans the confidential documents by the scanner 106 based on the input through the touch panel of the display unit 113*b* or the operation unit 113*a*, and reads the characters. The CPU of the MFP 1 converts the read characters into the confidential document data, and displays the confidential document data on the display unit 113*b* of the MFP 1. Thus, the specified person can confirm the confidential documents as to who prints and how many copies are stored where.

Further, based on the confidential document data stored in the storage unit 52, the CPU 51 of the management server 5 transmits a message of progress, state or the like through the network interface 53 to the specified person (for example, a printing person, a copying person, a confidential document manager, a supervisor of the printing person or copying person, etc,) after a fixed period has passed since the printing or copying was performed or after a time limit has expired. The management server 5 transmits the message to the specified person every day until the confidential documents are disposed of, for example, one week before the storage period/ disposal period, the day of the storage period/disposal period, or the next day after the storage period/disposal period. Besides, the specified person and the frequency of transmission of the transmitted message can be set by the input unit 54. Besides, in the case where the setting is made so that the storage unit of the MFP records the confidential document data, the MFP made to have the function of transmitting the message can be set. For example, only the specific MFP can be made to have the function of transmitting the message, or the MFP having printed or copied the confidential documents can be made to have the function. The content (information may be put in the printed character) of the confidential document data includes who is the printing person/copying person, when is the printing/copying date, what confidential documents (title, only rough information) are printed/copied, where (place of a storing shelf, etc.) the confidential documents to be printed/copied are stored, whether the documents are temporarily printed, how many copies/prints are made for each, until when each is stored or by when each is disposed of, whether copying is inhibited or not, and the like.

The management server 5 transmits the message to the specified person in order to notify the disposal of the confidential documents, so that it is possible to prevent the specified person from forgetting to dispose of the confidential documents.

Next, the disposition of the printed or copied confidential documents will be described below. When the printed or copied confidential documents are disposed of, the user shreds the confidential documents by the shredder 6 to keep the confidentiality. First, when the confidential documents are inserted in the document insertion unit 61 of the shredder shown in FIG. 6, the character read unit 62 reads the characters printed on the confidential documents. The shredder 6 transmits the character information read by the character read unit 62 to the management server 5 to manage the confidential document data or the MFP 1 (in the case where it is used in place of the management server 5).

The CPU 51 of the management server 5 confirms consistency between the confidential documents to be disposed of by the shredder 6 and disposal approval based on the character information read by the character read unit 62 of the shredder 6 and the confidential document data stored in the storage unit 52. The consistency of the disposal approval is executed such that for example, the CPU 51 of the management server 5 compares the storage period or the disposal period recorded in the confidential document data with the date when the confidential documents are to be disposed of. When the consistency of the disposal approval is confirmed, the shredding unit 63 shreds the confidential documents. The pieces of paper of the shredded confidential documents are received in the chip receiving unit 64. The reading system in the character read unit 62 of the shredder 6 includes, for example, a manual scan system, a CCD scan system, a laser scan system, and an image scan system.

At that time, the CPU 51 of the management server 5 updates the confidential document data of the confidential documents disposed of. For example, the number of prints of the confidential document data is updated. With respect to the confidential documents to be shredded by the shredding unit 63 of the shredder 6, when the CPU 51 of the management server 5 determines that the number of prints/copies recorded in the confidential document data is one, when the shredding unit 63 of the shredder 6 shreds the confidential documents, the management server 5 deletes the confidential document data corresponding to the confidential documents stored in the storage unit 52.

As described above, the management server 5 determines the consistency between the confidential documents to be disposed of and the confidential document data, so that it is possible to accurately perform management as to the remaining number of copies of the currently printed confidential documents, until when they are stored, and the like.

Besides, the disposal approval is a scheme in which before shredding to dispose of the confidential documents, the disposal approval of the confidential documents is previously obtained from a printing person, a copying person, a confidential document manager, or a supervisor of the printing person or the copying person. For example, the confidential document manager or the supervisor of the printing person or the copying person sets the disposal approval of the confidential documents from the management server 5 or the PC connected through the LAN. The management server 5 adds the disposal approval information to the confidential document data stored in the storage unit 52 and records it. The disposal approval is concerned with, for example, the information indicating the storage period or the disposal period recorded in the confidential document data.

In the case where the consistency between the confidential documents to be disposed of by the shredder 6 and the disposal approval of the confidential document data can not be confirmed, the shredder 6 gives a warning sound by a not-shown buzzer to notify the user who tries to dispose the confidential documents that the disposal approval can not be confirmed, that is, to cause the user to again confirm whether disposal may be performed or not. Instead of the buzzer to give the warning sound, a not-shown warning lamp may be used. Besides, the user presses a not-shown disposal confirmation button, so that the shredding unit 63 of the shredder 6 is started, and the confidential documents are shredded. The notification to urge the second confirmation as to whether the disposal may be made or not can be set each time the confidential documents are disposed of, or only in the case of the confidential documents to be finally disposed of.

The shredder 6 makes a notification as to whether the confidential documents whose disposal approval can not be confirmed can be disposed of or not, so that it is possible to prevent the user from erroneously disposing of the confidential documents.

Figure 7:
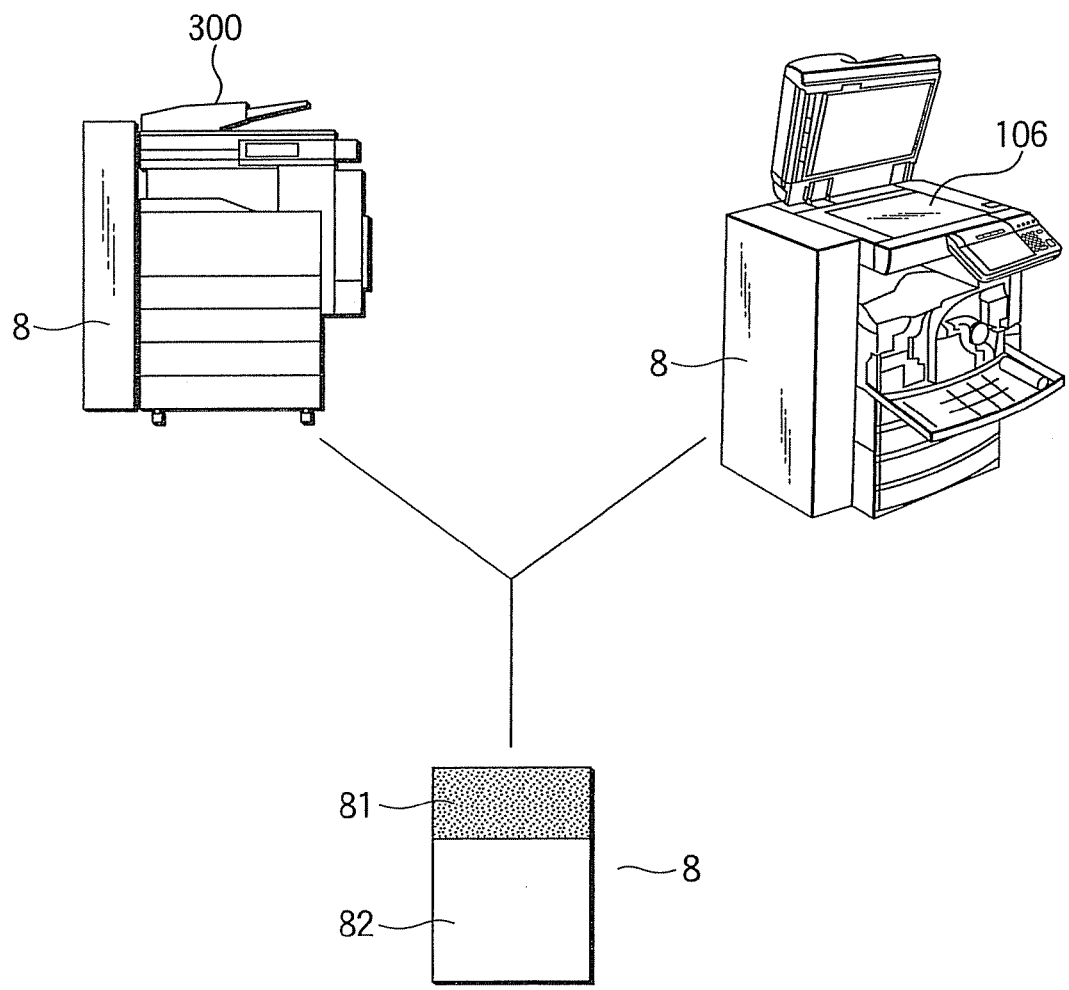
FIG. 7 is a view showing the image forming apparatus and the structure of a document disposal apparatus in the embodiment of the invention.

Besides, FIG. 7 shows a structural example in which a document disposal unit 8 is provided in the MFP 1 shown in FIG. 2. The operation of the MFP 1 is the same as the foregoing operation example. The document disposal unit 8 includes a shredding unit 81 and a chip receiving unit 82. The scanner 106 reads characters printed on the confidential documents. In the case where the user disposes of the confidential documents, after pressing the touch panel of the display unit 113b of the MFP 1 or the operation unit 113a, the user inserts the confidential documents into the automatic document feeder 300.

The scanner 106 reads the characters printed on the confidential documents sent by the automatic document feeder 300. The CPU 101 of the MFP 1 transmits the information of the characters read by the scanner 106 to the management server 5 to manage the confidential document data or the MFP (in the case where the MFP is used in place of the management server) through the network interface 112. The CPU 51 of the management server 5 confirms the consistency between the confidential documents to be disposed of and the disposal approval registered in the confidential document data. When the CPU 51 of the management server 5 confirms the consistency between the confidential documents and the disposal approval, the confidential documents are transported to the document disposition unit 8, and the shredding unit 81 shreds the confidential documents. The pieces of paper of the shredded confidential documents are received in the chip receiving unit 82.

At that time, the CPU 51 of the management server 5 updates the confidential document data of the confidential documents disposed of. For example, the number of prints of the confidential document data is updated. With respect to the confidential documents to be shredded by the shredding unit 63 of the shredder 6, when the CPU 51 of the management server 5 determines that the number of prints/copies recorded in the confidential document data is one, when the shredding unit 63 of the shredder 6 shreds the confidential documents, the management server 5 deletes the confidential document data corresponding to the confidential documents stored in the storage unit 52.

When the user copies the confidential documents by the MFP 1, the CPU 51 of the management server 5 confirms the consistency between the information of characters of the confidential documents read by the scanner 106 and the disposal approval of the confidential document data recorded in the storage unit 62. In the case where information indicating inhibition of copying is set in the confidential document data, the CPU 51 of the management server 5 transmits the information indicating that copying of the confidential documents is inhibited to the MFP 1 through the network interface 63. The CPU 101 of the MFP 1 having received the information indicating that copying is inhibited transfers the confidential documents to the shredding unit 81 and performs control to shred them.

As stated above, when the management server 5 determines that the disposal approval of the confidential documents can not be obtained, the shredding unit 81 shreds the confidential documents without returning the confidential documents to the user who attempts to copy them. Thus, the confidential documents whose copying is inhibited can not be copied, and the confidentiality can be ensured.

Further, when the confidential document data stored in the storage unit 62 of the management server 5 is changed (for example, copy inhibition is changed to copy permission, or the storage place of the confidential documents is changed), for example, the confidential document manager to manage the management server 5 can change the confidential document data by using the display unit 36 or the input unit 34. Thus, when the user copies the confidential documents by the MFP 1, the management server 5 confirms the consistency between the information of the characters of the confidential documents read by the scanner 106 of the MFP 1 and the disposal approval of the confidential document data stored in the storage unit 62 of the management server 5.

When the CPU 51 of the management server 5 determines that the confidential document data has been changed, the changed confidential document data is converted into new characters. The management server 5 transmits information of the new characters to the MFP 1. The printer 107 of the MFP 1 prints the new characters on the confidential documents at the same time as the printing of the confidential documents. The automatic document feeder 300 transports the confidential documents of the copy source to the document disposition unit 8, and the shredding unit 81 shreds the confidential documents.

As stated above, the specified confidential document manager can change the confidential document data. Further, when the user copies the confidential documents, when the management server 5 determines that the confidential document data corresponding to the characters attached to the confidential documents has been changed, the MFP 1 prints the characters corresponding to the new changed confidential document data on the copy. Since the shredding unit 81 shreds the confidential documents of the copy source, the duplication of the same confidential documents does not occur, and the disposal of the confidential documents and the data of the confidential documents can be accurately managed.

Incidentally, although the confidential document data is made the one-dimensional bar code, the two-dimensional bar code or the mark, the management may be made such that the confidential data is stored in the data storage part such as an RFID, a circuit pattern or a memory element, and is attached to the printed documents. Besides, in this case, instead of the scanner, respective dedicated readers to read data are provided.

Next, a second embodiment of the invention will be described by use of FIG. 8 and FIG. 9. For example, when the user prints confidential documents used for a meeting by the MFP 1, the CPU 31 of the PC 3 starts a printer drive shown in FIG. 8 on the display unit 36 by the input of the user. The user uses the printer drive to set the names of respective persons to which the confidential documents are delivered. In the printer driver, a printing person selects each person of meeting participants from an address book, and registers the person (participant) to which the materials are delivered. Besides, when the confidential documents are printed, the printer 107 of the MFP 1 prints characters and names corresponding to the confidential document data different among the respective persons on the printed confidential documents.

With respect to the distributed materials, the storage unit 62 of the management server 5 stores data indicating who is the user, when is the date of printing, what confidential documents (title or only rough information) are printed, where (place of a storing shelf or the like) the printed confidential documents are stored, whether the documents are temporarily printed, how many prints are made for each, until when each is stored or by when it is disposed of, and whether copying is inhibited or not. The data stored in the storage unit 62 of the management server 5 may be stored in the storage unit 62 of the management server 5 before the printer 107 of the MFP 1 prints the distributed materials.

Next, FIG. 9 shows a setting screen displayed on the control panel 113 of the MFP 1 when the user copies the confidential documents by the MFP 1. When the user selects a security shown in FIG. 9 by the touch panel of the control panel 113 or the operation unit 113*a*, the CPU 101 displays the screen on which an address book icon can be selected on the control panel 113. The user selects the address book icon, and registers the person to whom the copy is delivered as a registrant. The storage unit 104 of the MFP 1 records registrant data of persons to whom the copy is delivered. Here, the user can further record information similar to the confidential document data as the registrant data.

Based on the registrant data of the persons to whom the copy is delivered, which is recorded in the storage unit 104 of the MFP 1, when the copy is copied by the printer 107, the CPU 101 controls to print characters different among the respective copies to be delivered to the respective persons. The CPU 101 transmits the respective registrant data to the management server 5, and the storage unit 62 of the management server 5 stores the registrant data.

Next, a description will be given to a case where a registrant having received a copy disposes of the copy on which his or her own character is printed by the shredder 6. When the registrant inserts the copy into the document insertion unit 61, the character read unit 62 reads the character printed on the copy. The CPU 51 of the management server 5 confirms the consistency between the copy to be disposed of by the shredder 6 and the disposal approval based on the character information read by the character read unit 62 of the shredder 6 and the registrant data recorded in the storage unit 52. The consistency of the disposal approval is executed such that for example, the CPU 51 of the management server 5 compares the storage period or the disposal period recorded in the registrant data with the date when the copy is disposed of. When the CPU 51 of the management server 5 confirms the consistency of the disposal approval, the shredding unit 63 shreds the confidential documents. The shredded copy is received in the chip receiving unit 64.

At that time, the CPU 51 of the management server 5 updates the registrant data. For example, there are distributors of copies recorded in the registrant data. The CPU 51 of the management server 5 determines from the character read by the character read unit 62 of the shredder 6 that the copy has been delivered to whom. When the CPU 51 of the management server 5 confirms the consistency of the disposal approval, the name of the distributor of the disposal approved copy is deleted from the distributors of the copies recorded in the registrant data, and the registrant data is updated.

According to this embodiment, even in the case, where the user prints or copies the confidential documents by the MFP 1 and delivers them to another person, the person to whom the print or copy is delivered can be registered. Besides, the storage unit 104 of the MFP 1 or the storage unit 32 of the management server 5 records not only the printing person or copying person but also all persons (registrants) to whom the materials are delivered. Thus, the management of the persons having the prints or copies becomes easy. In the case where the person having the print or copy tries to dispose of the print or copy, it is possible to manage who does not dispose of the print or copy.

Additional advantages and modifications will readily occur those skilled in the art. Therefore, the invention in its broader aspects is not limited to the specific details and representative embodiments shown and described herein. Accordingly, various modifications may be made without departing from the spirit or scope of the invention as defined by the appended claims and equivalents thereof.

What is claimed is:

1. A document management system, comprising:
a document receiving unit configured to receive document data;
a print document data receiving unit configured to receive print document data for managing documents to be printed corresponding to the document data;
a personal data receiving unit configured to receive personal data indicating names of respective persons set in a printer driver, to whom the documents are delivered;
a storage unit configured to store management data associating the print document data with the personal data;
a generate unit configured to generate print data representing at least the personal data and the print document data, the print data managing the persons to whom the documents are delivered;
a print unit configured to print the documents and the print data, wherein the print data is a watermark character that is created as a function of the personal data and the print document data; and
a control unit configured to update the management data if the print data is read.

2. The system of claim 1, wherein the generate unit generates other print data different from the print data, if the personal data receiving unit receives other personal data different from the personal data.

3. The system of claim 1, comprising:
a user information receiving unit configured to receive user identification information for identifying a user using a copy function or a printer function; and
wherein:
the print document data includes the user identification information; and
the control unit manages the documents corresponding to the personal data associated with the user identification information.

4. The system of claim 3, comprising:
a read unit configured to read the print data; and
a shred unit configured to shred at least one of the documents; and
wherein the control unit deletes the personal data indicating the print data read by the read unit from the personal data associated with the user identification information, if the shred unit shreds at least one of the documents.

5. The system of claim 1, wherein:
the print document data includes data for a number of print corresponding to the document data;
the storage unit stores the management data associating the number of the print with each of the personal data; and
the control unit manages a number of the documents delivered to each person.

6. The system of claim 5, comprising:
a user information receiving unit configured to receive user identification information for identifying a user using a copy function or a printer function; and
wherein:
the print document data includes the user identification information; and
the control unit manages the documents corresponding to the personal data associated with the user identification information.

7. An image forming apparatus, comprising:
a document receiving unit configured to receive document data;
a print document data receiving unit configured to receive print document data for managing documents to be printed corresponding to the document data;
a personal data receiving unit configured to receive personal data indicating names of respective persons set in a printer driver to whom the documents are delivered;
a storage unit configured to store management data associating the print document data with personal data;
a generate unit configured to generate print data representing at least the person data and the print document data, the print data managing the persons to whom the documents are delivered; and
a print unit configured to print the documents and the print data, wherein the print data is a watermark character that is created as a function of the person data and the print document data.

8. The apparatus of claim 7, wherein the generate unit generates other print data different from the print data, if the personal data receiving unit receives other personal data different from the personal data.

9. The apparatus of claim 7, comprising:
a read unit configured to read the print data; and
a transmission unit configured to transmit information corresponding to the print data to an external device which updates the management data for the print data read by the read unit, if the print data is read.

10. The apparatus of claim 7, comprising:
a read unit configured to read the print data; and
a control unit configured to update the management data for the print data read by the read unit, if the print data is read.

11. The apparatus of claim 10, comprising:
a user information receiving unit configured to receive user identification information for identifying a user using a copy function or a printer function; and
wherein:
the print document data includes the user identification information; and
the control unit manages the documents corresponding to the personal data associated with the user identification information.

12. The apparatus of claim 11, comprising:
a shred unit configured to shred at least one of the documents; and
wherein the control unit deletes the personal data indicating the print data read by the read unit from the personal data associated with the user identification information, if the shred unit shreds at least one of the documents.

13. The apparatus of claim 10, wherein:
the print document data includes data for a number of print corresponding to the document data;
the storage unit stores the management data associating the number of the print with each of the personal data; and
the control unit manages a number of the documents delivered to each person.

14. A document management method implemented by an image forming apparatus, comprising:
receiving document data;
receiving print document data for managing documents to be printed corresponding to the document data;
receiving personal data indicating names of respective persons set in a printer driver to whom the documents are delivered;
storing management data associating the print document data with the personal data;
generating print data representing at least the person data and the print document data, the print data managing the persons to whom the documents are delivered; and
printing the documents and the print data, wherein the print data is a watermark character that is created as a function of the person data and the print document data.

15. The method of claim 14, comprising:
generating other print data different from the print data, if receiving other personal data different from the personal data.

16. The method of claim 14, comprising:
reading the print data; and
transmitting information corresponding to the print data to an external device which updates the management data for the print data read by the read unit, if the print data is read.

17. The method of claim 14, comprising:
reading the print data; and
updating the management data for the print data read by the read unit, if the print data is read.

18. The method of claim 17, comprising:
receiving user identification information for identifying a user using a copy function or a printer function; and
wherein:
the print document data includes the user identification information; and
the control unit manages the documents corresponding to the personal data associated with the user identification information.

19. The method of claim 18, comprising:
shredding at least one of the documents; and
deleting the personal data indicating the read print data from the personal data associated with the user identification information.

20. The method of claim 14, wherein:
the print document data includes data for a number of printing corresponding to the document data; and
comprising:
storing the management data associating the number of the printing with each of the personal data; and
managing a number of the documents delivered to each person.

* * * * *